United States Patent [19]
Sakai

[11] Patent Number: 4,833,715
[45] Date of Patent: May 23, 1989

[54] FM STEREO RECEIVER

[75] Inventor: Tsuneo Sakai, Iwaki, Japan

[73] Assignee: Alps Electric Co., Ltd., Japan

[21] Appl. No.: 119,830

[22] Filed: Nov. 12, 1987

[30] Foreign Application Priority Data

Mar. 6, 1987 [JP] Japan .................................. 62-51580
Mar. 6, 1987 [JP] Japan .................................. 62-51579

[51] Int. Cl.$^4$ .......................... H04R 5/00; H04H 5/00
[52] U.S. Cl. ...................................... 381/17; 381/10;
381/11; 381/13
[58] Field of Search ....................... 381/10, 11, 12, 13,
381/2-3, 17, 94; 358/144

[56] References Cited

U.S. PATENT DOCUMENTS

| | | | |
|---|---|---|---|
| 4,457,012 | 6/1984 | Carver | 381/13 |
| 4,491,957 | 1/1985 | Kamalski | 381/13 |
| 4,691,357 | 9/1987 | Kanda | 381/13 |
| 4,710,958 | 12/1987 | Tazaki | 381/10 |
| 4,727,580 | 2/1988 | Sakai | 381/7 |
| 4,742,570 | 5/1988 | Ichikawa | 381/94 |

FOREIGN PATENT DOCUMENTS

0158200 9/1984 Japan ................................... 381/17

Primary Examiner—Jin F. Ng
Assistant Examiner—David H. Kim
Attorney, Agent, or Firm—Guy W. Shoup; Paul J. Winters; Stephen L. Malaska

[57] ABSTRACT

An FM stereo receiver includes a level detecting circuit for detecting the received electric field intensity and a pseudo stereo circuit for changing the phase of an entered signal and outputting two signals different in phase. When the level detecting circuit detects a received electric field intensity below a threshold level, monaural signals produced from outputs of a stereo demodulator are applied to the pseudo stereo circuit to produce pseudo stereo signals.

9 Claims, 6 Drawing Sheets

FM STEREO RECEIVER

FIELD OF THE INVENTION

This invention relates to an FM stereo receiver, and more particularly to an FM stereo receiver having an improved signal-to-noise (S/N) ratio in presence of multipath noises or in a weak electric field.

BACKGROUND OF THE INVENTION

It is known that an FM stereo receiver can be improved in its S/N ratio by changing it from the stereo mode into the monaural mode when a multipath noise is large or upon a weak electric field causing an increase in the noise level.

In this connection, a prior art technology is configured to monitor the received electric field intensity and the multipath noise level, to change the receiver from stereo mode into monaural mode when the received electric field intensity drops below a predetermined threshold level, to change the receiver from monaural mode to stereo mode when the received electric field intensity exceeds the threshold level, and to change the receiver from stereo mode into monaural mode also upon a received electric field intensity above a predetermined level when the multipath noise is large.

As described, the prior art FM stereo receiver is configured to change its mode between stereo and monaural modes about a predetermined threshold level, concerning each of the received electric field intensity and the multipath noise level.

Therefore, when the received electric field intensity or the multipath noise level varies about the predetermined threshold level, the receiver is often changed into stereo mode having a sound extent or to monaural mode not having a sound extent upon every change in the received electric field intensity or in the multipath noise level about the threshold level. This gives a user an acoustic incompatibility.

Another prior art technology is configured to degrade the separation degree in response to the received electric field intensity to sequentially change the receiver from stereo mode to monaural mode when the received electric field intensity drops below a predetermined threshold level. This certainly alleviates such an acoustic incompatibility as compared to a direct change into monaural mode. However, an expected sound extent is lost upon separation control, and this results in lack of stereophonic effect.

OBJECT OF THE INVENTION

It is therefore an object of the invention to provide an FM stereo receiver having an improved S/N ratio, never giving a user an acoustic incompatibility, when the multipath noise level is large or upon a weak electric field in which the noise level increases.

A further object of the invention is to provide an FM stereo receiver which improves the S/N ratio upon a large multipath noise level or in a weak electric field causing an increase in the noise level, never gives a user an acoustic imcompatibility, and gives a sufficient stereophonic effect in a wide range of the received electric field.

SUMMARY OF THE INVENTION

Figure 1:
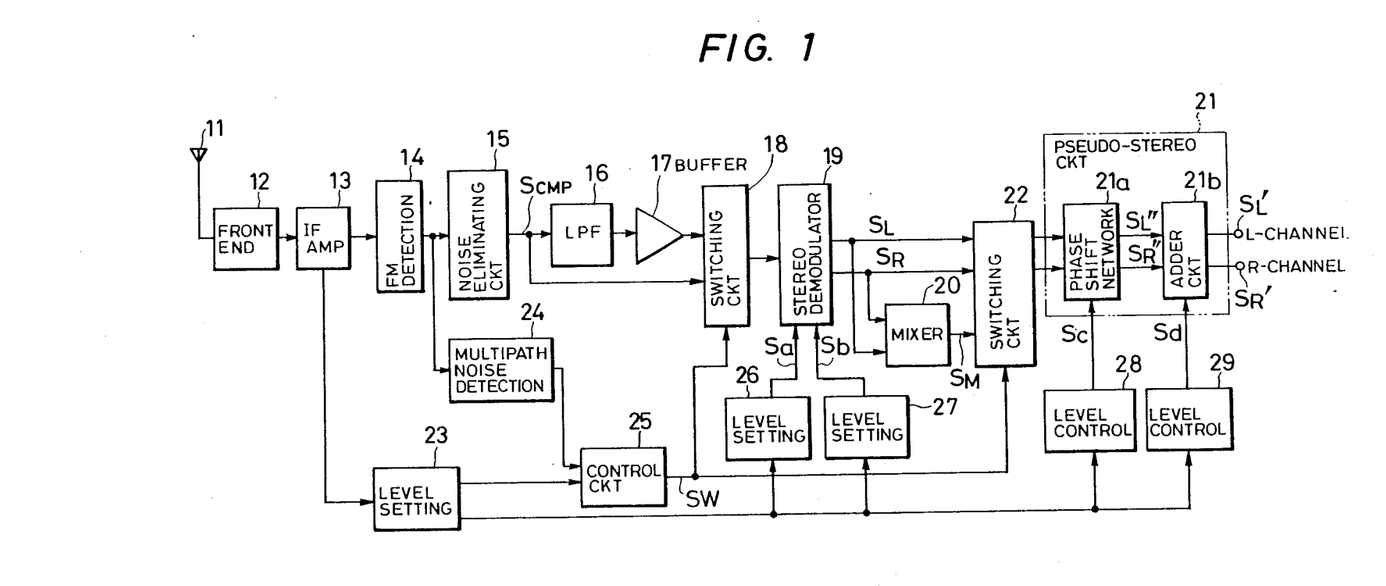
FIG. 1 is a block diagram of an FM stereo receiver according to the invention.

According to the invention, there is provided an FM stereo receiver as shown in FIG. 1 which comprises a stereo demodulator 19, a mixer 20, a pseudo stereo circuit 21, a switching circuit 22, a level detecting circuit (level meter) 23, and a multipath noise detecting circuit 24.

Figure 2:
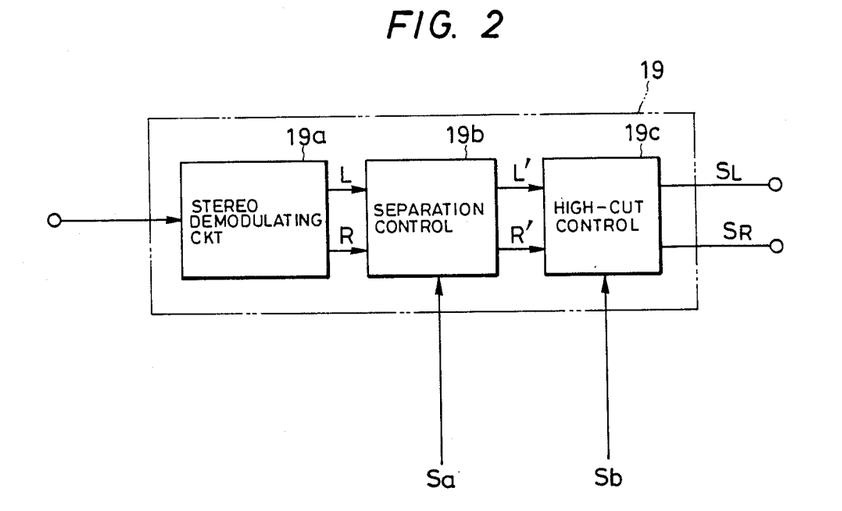
FIG. 2 is a block diagram of a stereo demodulator.

The stereo demodulator 19 includes a stereo circuit 19a, a separation control circuit 19b and a high-cut control circuit 19c as shown in FIG. 2.

With this arrangement, the received electric field intensity is detected by the level detector 23 whereas the multipath noise level is detected by the multipath noise detecting circuit 24. The mixer 20 mixes up stereo signals SL and SR of L and R channels, and produces a monaural signal SM. The pseudo stereo circuit 21 is supplied with the stereo signals SL and SR or the monaural signal SM according to the received electric field intensity, and responsively produces signals SL' and SR' which are different in phase.

Under conditions that the received electric field intensity is larger than a predetermined threshold level EH2 and that no multipath noise exists, the switching circuit 22 permits the stereo signals SL and SR from the stereo demodulator 19 to pass through the pseudo stereo circuit 21 to speakers (not shown). Under conditions that the received electric field intensity is larger than the predetermined threshold level and that a multipath noise exists and under the condition that the received electric field intensity is smaller than the threshold level, the monaural signal SM from the mixer 20 is entered in the pseudo stereo circuit 21 so that pseudo stereo signals SL' and SR' produced responsively by the pseudo stereo circuit 21 are supplied to the speakers to establish a pseudo stereophonic mode.

The stereo demodulating circuit 19a (FIG. 2) produces stereo signals L and R from a composite signal SCMP. The separation control circuit 19b is supplied with the stereo signals L and R, controls their separation degree, and produces stereo signals SL and SR. The pseudo stereo circuit 21 changes the phase of an entered signal, and produces pseudo stereo signals SL' and SR' which are different in phase.

When the received electric field intensity detected by the level detector 23 is larger than a first threshold level (55dBµ, for example), the separation degree is maximized, and the signals L and R generated by the stereo demodulating circuit 19a are maintained in the original forms and used to establish the stereophonic mode.

On the other hand, when the received electric field intensity is smaller than the first threshold level, the separation control circuit 19b and the pseudo stereo circuit 21 are activated to effect their separation control and sound field correcting operations respectively, and an output of the separation control circuit 19b is entered in the speakers via the pseudo stereo circuit 21, so that the separation operation improves the S/N ratio and the sound field correcting operation of the pseudo stereo circuit corrects a drop in the sound extent caused by the separation operation. In this fashion, the S/N ratio is improved, maintaining the sound extent (stereophonic effect).

When the received electric field intensity is smaller than a second threshold level which is lower than the first threshold level, a monaural signal produced from the stereo output is entered in the speakers via the pseudo stereo circuit 21 to establish a pseudo stereo mode having a stereophonic effect.

DETAILED DESCRIPTION

FIG. 1 is a block diagram of an FM stereo receiver according to the invention.

Reference numeral 11 refers to an antenna, 12 to a front end, 13 to an intermediate frequency (IF) amplifier, 14 to an FM detector, 15 to a noise eliminating circuit for removing pulsating noises (ignition noise, etc.) included in outputs of the FM detector, 16 to a low pass filter (LPF) for transmitting main signals and pilot signals of (L+R) included in a composite signal SCMP, 17 to a buffer amplifier, 18 to a first switching circuit responsive to the received electric field intensity and to the multipath noise level to selectively output the composite signal SCMP or a low pass filter output, and 19 to a stereo demodulator supplied with a signal from the switching circuit to output stereo signals SL and SR for L and R channels, respectively.

The stereo demodulator 19 comprises, as shown in FIG. 2, a stereo demodulating circuit 19a which produces stereo signals L and R for right and left channels from an entered signal, a separation control circuit 19b which controls the channel separation degree, based on a control signal Sa, and high-cut circuit 19c which attenuates high band components (higher than 7kHz, for example) of stereo signals L' and R' outputted from the separation control circuit 19b, based on a control signal Sb, and produces stereo signals SL and SR.

Reference numeral 20 designates a mixer for mixing stereo signals SL and SR and outputting a monaural signal SM. Reference numeral 21 denotes a pseudo stereo circuit which changes the phase of an entered signal and produces two pseudo stereo signals SL' and SR' different in phase. The pseudo stereo circuit 21 includes a phase shift network 21a and an adder circuit 21b.

Figure 3:
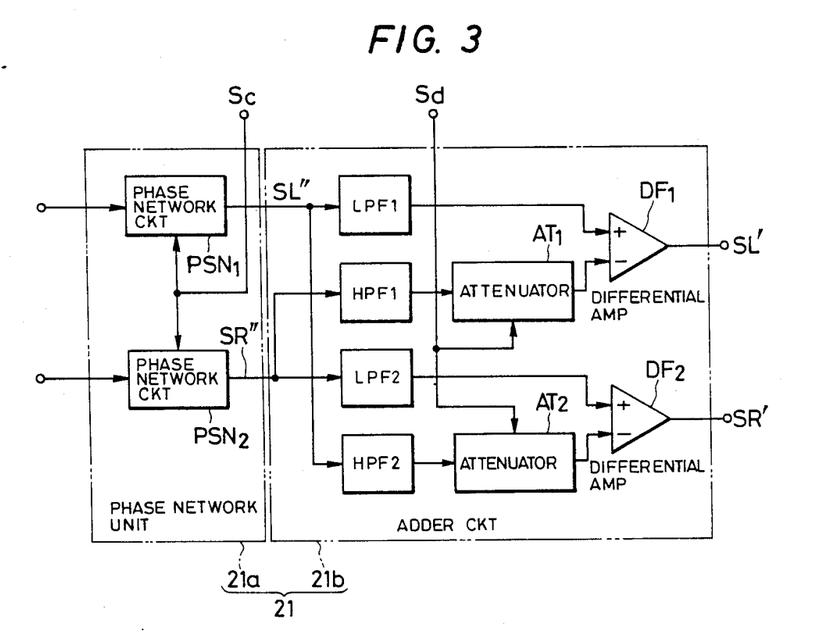
FIG. 3 is a block diagram of a pseudo stereo circuit.
Figure 4:
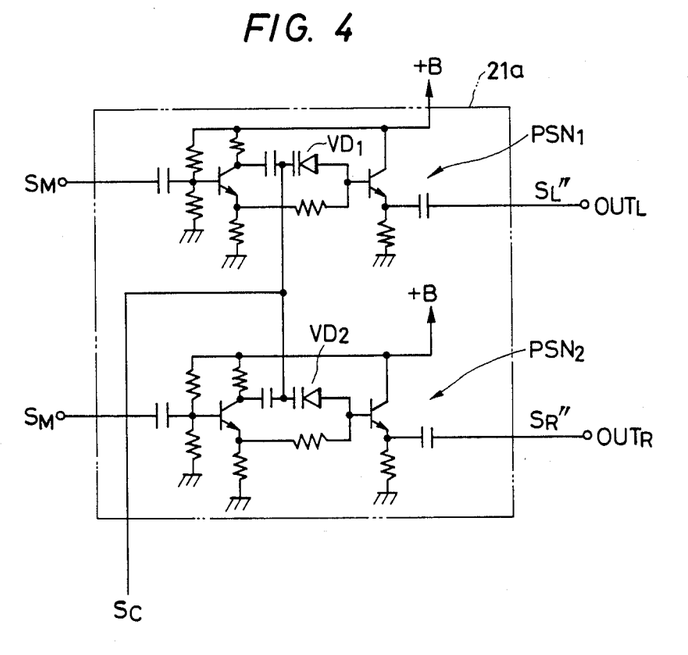
FIG. 4 is a circuit diagram of a phase shift network circuit.
Figure 5:
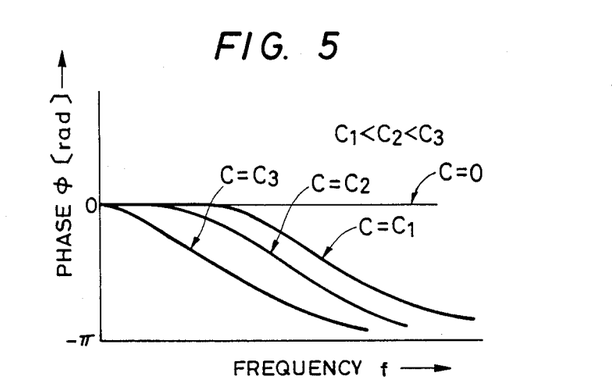
FIG. 5 is a view showing a relationship between the electrostatic capacitance of a varactor diode and the difference $\phi$ between input and output phases in the phase shift network circuit.

FIG. 3 is a block diagram of the pseudo stereo circuit 21. The phase shift network 21a consists of two phase network circuits PSN1 and PSN2 for an L-channel and an R-channel, respectively. Each phase network circuit is controlled in its output signal phase by a control signal Sc. A specific circuit arrangement of the phase shift network circuits PSN1 and PSN2 is shown in FIG. 4. In FIG. 4, by changing a d.c. voltage of the control signal Sc and thereby varying the electrostatic capacitance C of varactor diodes VD1 and VD2, the phase difference $\phi$ between outputs is selected as shown in FIG. 5. Therefore, by using varactor diodes VD1 and VD2 having different characteristics in respective phase network circuits PSN1 and PSN2, a phase difference $\theta$ from zero to a desired value is established between output signals SL'' and SR'' obtained at terminals OUTL and OUTR in response to the d.c. level of the control signal Sc.

Referring back to FIG. 3, the adder circuit 21 of the pseudo stereo circuit includes first and second low pass filters LPF1 and LPF2 having a uniform characteristic, first and second high pass filters HPF1 and HPF2 having a uniform characteristic, first and second attenuators AT1 and AT2 controlled in attenuation degree by a control signal Sd and having a uniform characteristic, and first and second differential amplifiers DF1 and DF2. First and second low pass filters LPF1 and LPF2 transmit low band components of signals SL'' and SR'' outputted respectively from the phase network 21a. First and second high pass filters HPF1 and HPF2 transmit high band components of the signals SL'' and SR''. First and second attenuators AT1 and AT2 attenuate signals outputted from respective high pass filters, based on the control signal Sd. The first differential amplifier DF1 amplifies the difference between an output signal of the low pass filter LPF1 and an output signal of the attenuator AT1 and produces a pseudo stereo signal SL' for the L-channel. The second differential amplifier DF2 amplifies the difference between an output signal of the low pass filter LPF2 and an output signal of the attenuator AT2 and produces a pseudo stereo signal SR' for the R-channel.

Figure 6:
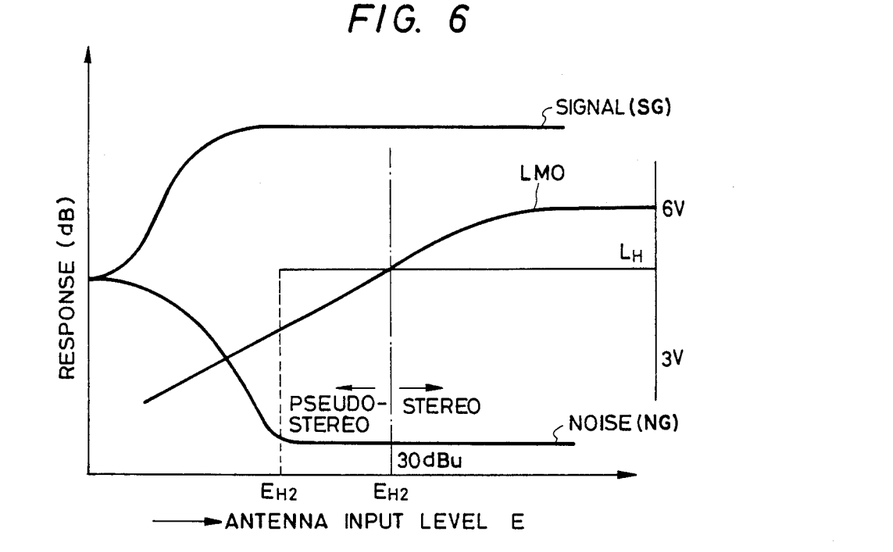
FIG. 6 is a characteristic diagram of a received level detecting circuit.

Returning back to FIG. 1, reference numeral 22 denotes a second switching circuit responsive to the received electric field intensity and to the multipath noise level to selectively output the stereo signals SL and SR from the stereo demodulator 19 or the monaural signal SM from the mixer 20 to the pseudo stereo circuit 21. Reference numeral 23 designates a level meter (level detecting circuit) connected to the intermediate frequency amplifier 13 to produce a level signal LMO having a value responsive to the received electric field intensity (antenna input level) E as shown in FIG. 6. In FIG. 6, NS indicates the noise characteristic, and SG denotes the signal characteristic.

Reference numeral 24 denotes a multipath noise detecting circuit supplied with an output from the FM detector 14 (or noise detecting circuit 15) to detect multipath noise components above 100kHz. Reference numeral 25 designates a control circuit.

Figure 7:
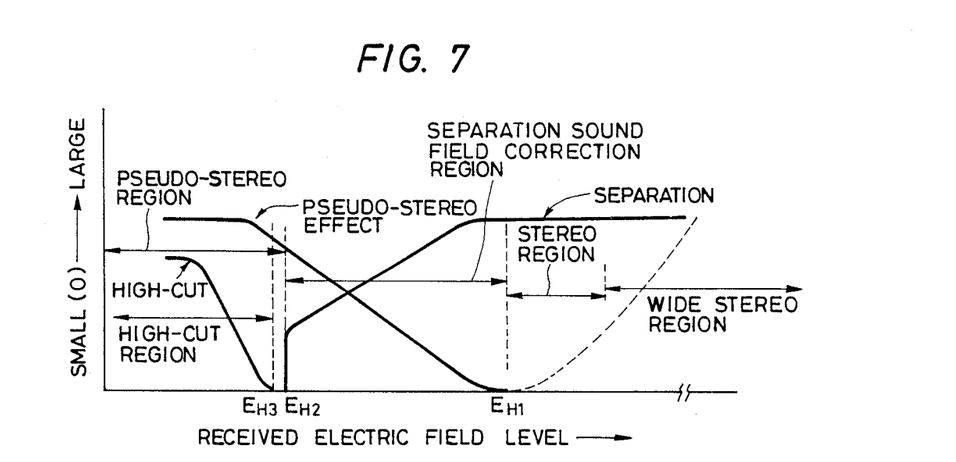
FIG. 7 is a characteristic diagram showing pseudo stereo effect, separation and high-cut degrees against received electric field intensity.

When the received electric field intensity is higher than a threshold level EH2 (about 30 db$\mu$ as shown in FIGS. 6 and 7), the control circuit 25 causes the first switching circuit 18 to select and output the composite signal SCMP and causes the second switching circuit 22 to output stereo signals SL and SR from the stereo demodulator 19. When the received electric field intensity is lower than the threshold level EH2, the control circuit 25 causes the first switching circuit 18 to select and output the main signal and the pilot signal outputted from the low pass filter 16 and causes the second switching circuit 22 to output the monaural signal SM from the mixer 20. Also when the received electric field intensity is higher than the threshold level EH2, the control circuit 25 causes the first switching circuit 18 to output the main signal and the pilot signal from the low pass filter 16 and causes the second switching circuit 22 to output the monaural signal SM from the mixer 20 if the multipath noise level detected by the multipath noise detecting circuit 24 is large.

Reference numeral 26 designates a level setting circuit which produces a control signal Sa which degrades the separation degree of the separation circuit 19b (FIG. 2) as the received electric field intensity decreases in the range below the first threshold level EH1 (about 55dBµ as shown in FIG. 7). Reference numeral 27 denotes a level setting ciruit which produces a control signal Sb which increases the high band attenuation degree of the high-cut circuit 19c as the received electric field intensity decreases in the range below a third threshold level EH3 (about 25dBµ) near the second threshold level EH2 (about 30dBµ). Reference numeral 28 designates a level control circuit which produces a control signal Sc which increases the phase difference between signals SL" and SR" outputted from the phase shift network 21a as the received electric field intensity decreases while EH2<E<EH1 (during sound field correction). Reference numberal 29 denotes a level control circuit which produces a control signal Sd which increases the phase difference (particularly in high bands) between pseudo stereo signals SL' and SR' outputted from the adder circuit 21b as the received electric field intensity decreases during sound field correction.

Both control signals Sc and Sd are controlled so that the pseudo stereo effect (sound field correction effect) is increased as the received electric field intensity decreases during sound field correction (EH2<E<EH1). FIG. 7 shows relationships among the pseudo stereo effect (sound field correction effect), separation and high-cut degrees and respective threshold levels EH1 through EH3.

In the pseudo stereo circuit 21, electrostatic capacitances of the varactor diodes VD1 and VD2 of the phase shift network circuits PSN1 and PSN2 (FIG. 4) are controlled by the control signal Sc produced by the level control circuit 28, and a phase difference $\theta$ is produced responsively between output signals SL" and SR". The output signals SL" and SR" may be used as pseudo stereo signals entered in the speakers (not shown) to give a sound extent as compared to monaural signal input. In order to further increase the sound extent by the pseudo stereo signals SL" and SR", signal SL" is applied to the plus input terminal of the differential amplifier DF1 through the low pass filter LPF1 (FIG. 3) whereas signal SR" is applied to the minus terminal of the differential amplifier DF1 through the high-pass filter HPF2. In this case, by selecting a value for the control signal Sd outputted from the level control circuit 29 to establish zero attenuation degree in the attenuator AT1, the pseudo stereo signal SL' is outputted as an opposite-phase component of low band components of signal SL" and high band components of signal SR". Similarly, the pseudo stereo signal SR' outputted from the differential amplifier DF2 is outputted as an opposite-phase component of low band components of signal SR" and high band components of signal SL". As a result, pseudo stereo signals SL' and SR' exhibit a large phase difference particularly in high band components, and a larger sound extent is obtained accordingly.

When the d.c. voltage of the control signal Sc is increased to establish zero electrostatic capacitances of the varacator diodes VD1 and VD2, the phase difference $\phi$ between the input and the output becomes zero in both phase shift network circuits PSN1 and PSN2, and the phase difference $\theta$ between output signals SL" and SR" also becomes zero. If the control signal Sd is further applied so as to increase the attenuation degree of the adder circuit 21b, the input of the differential amplifier DF1 is a signal alone resulting from transmitting the signal SL" through the low pass filter LPF1, and the input of the differential amplifier DF2 is a signal alone resulting from transmitting the signal SR" through the low pass filter LPF2. As a result, outputs SL' and SR' of respective differential amplifiers are outputted as identical signals having no phase difference and serving as monaural signals which stabilize the sound image at the center of the speakers but have no sound extent. In this case, high band components are cut out by respective low pass filters. However, by extending the frequency characteristics of the low pass filters, deterioration in the frequency characteristics caused by cutting high band components is minimized to a degree which may be neglected acoustically.

On the other hand, if the d. c. voltage of the control signal Sc is decreased gradually, the phase difference $\theta$ between output signals SL" and SR" of the phase shift network circuits PSN1 and PSN2 increases gradually, and if the attenuation degree is decreased gradually by the control signal Sd in the adder circuit 21b, the phase difference increases particularly in high band components. Therefore, when the pseudo stereo signals SL' and SR' are entered in the speakers, the sound image stability is degraded, and the sound extent is expanded.

A general operation of the arrangement of FIG. 1 is explained below. (A) Under a received electric field intensity above the first threshold level EH1 (FIG. 7) and in a low multipath noise level:

In these conditions, the first switching circuit 18 supplies the stereo demodulator 19 with the composite signal SCMP outputted from the noise eliminating circuit 15. The stereo demodulator 19 produces stereo signals SL and SR for right and left channels, using the composite signal SCMP. The second switching circuit 22 outputs the stereo signal SL and SR to speakers (not shown) via the pseudo stereo circuit 21 to produce a stereophonic sound having a sound extent and a sound image stability depending on the sound source. This is the stereo mode.

In this case, control signals Sa and Sb of the level setting circuits 26 and 27 are selected so that stereo signals L and R outputted from the stereo demodulating circuit 19a (FIG. 2) serve as stereo signals SL and SR in their original forms (so as to establish the maximum separation and zero high-cut), and control signals Sc and Sd are controlled so that the stereo signals SL and SR are entered in the speakers (not shown) in their original forms. In this fashion, the sound field correction effect (pseudo stereo effect) becomes zero. (B) Under a received electric field intensity below the first threshold level EH1:

When the received electric field intensity drops below the first threshold level EH1, noises increase. Therefore, the control signal Sa is controlled so that the separation control circuit 19b degrades the separation degree as shown in FIG. 7 to improve the S/N ratio as the received electric field intensity decreases.

Degradation of the separation degree causes a monaural tendency which narrows the sound extent and loses a stereophonic effect. In this connection, simultaneously with degradation of the separation degree, control signals Sc and Sd are controlled to rather reinforce the pseudo stereo effect as shown in FIG. 7 so as to compensate the drop in the sound extent caused by the separation control and maintain the sound extent, i.e. the stereophonic effect. This is the separation and sound field correction mode. (C) Under a received electric field intensity below the second threshold level EH2:

When the received electric field intensity drops below the second threshold level EH2, the control circuit 25 causes the level setting circuit 26 to generate a control signal Sc to establish zero separation degree, and generates a switch signal SW to cause the first switching circuit 18 to switchingly output a signal from the low pass filter 16 to reduce the noise and to cause the second switching circuit 22 to supply the pseudo stereo circuit 21 with a monaural signal SM from the mixer 20. As a result, the receiver is changed to a pseudo stereo mode by pseudo stereo signals produced from monaural signals SM. This is the pseudo stereo mode.

In the stereo mode of the receiver, the sound has an extent, and the stability sence of the sound source, i.e. the positional sence of the sound source is clear. In the pseudo stereo mode, however, the stability sence is lost although a sound extent exists. Therefore, when the receiver is changed directly from the stereo mode into the pseudo stereo mode, a user will feel an acoustic imcompatibility. In other words, changes in the sound invite an incompatibility to user's ears unless the receiver is changed between the stereo mode and the pseudo stereo mode in a fashion that changes in the sound extent and in the stability sence are small. The present invention can change a receiver into the pseudo stereo mode, not inviting an incompatibility, because the sound field correction mode of (B) is interposed to control magnitudes of the control signals Sc and Sd under a received electric field intensity below the first threshold level EH1 so that the pseudo stereo effect is increased as shown in FIG. 7 as the received electric field intensity decreases. Beside this, the present invention can establish a stereophonic sound field in the pseudo stereo mode in a weak electric field.

The invention receiver is configured to output the main signal (L+R) alone in lieu of the composite signal SCMP under a received electric field intensity below the threshold level EH2 for the reasons described below. That is, significant increase of distortion components of the composite signal due to noises invites an unreliable operation of the stereo demodulator 19, so that monaural signals SM produced from the stereo signals S and S by the mixer 20 include a lot of noises, which results mixture of increased noises in the pseudo stereo signals SL' and SR'. This is because large level noises exist particularly in the band of sub-signals (L−R) due to FM triangle noises and because the stereo demodulating circuit 19a becomes unreliable in its operation accordingly. In most cases, the stereo demodulating circuit is maintained reliable by removing noises in this band. Considering this fact, the first switching circuit 18 is activated to supply the stereo demodulator 19 with a signal from which sub signals (L−R) are removed when noises increase under a received electric field below the second threshold level EH2 or when the multipath noise becomes large as will be described later. (D) Under a received electric field intensity below the third threshold level EH3:

When the received electric field intensity drops below the threshold level EH3 (FIG. 7), the high-cut circuit 19c (FIG. 2) is activated to increase the cutting degree of high band components, based on the control signal Sd, as the received electric field intensity decreases, so as to improve the noise supressing effect in a weak electric field. This is the pseudo stereo and high-cut mode. (E) Under a multipath noise level above a predetermined threshold level:

Paragraphs (A) through (D) are referred to as being in a multipath noise level below a predetermined level. However, when the multipath noise increases above a predetermined threshold level regardless of the received electric field intensity, the control circuit 25 causes the first switching circuit 18 to select and output the main signal (L+R) from the low pass filter 16, and causes the second switching circuit 22 to supply the pseudo stereo circuit 21 with the monaural signal SM. The control circuit 25 further controls signals Sa, Sb, Sc and Sd to establish the pseudo stereo mode to decrease noises accordingly.

In the aforegoing description, the pseudo stereo effect (sound field correction effect) is zero above the first threshold level EH1 as shown by a solid line in FIG. 7. However, the receiver may be modified to control the control signals Sc and Sd above the first threshold level as shown by a dotted line in FIG. 7 so that the pseudo stereo effect increases as the received electric field intensity increases. By increasing the pseudo stereo effect with the magnitude of the received electric field intensity as shown by the dotted line as described above, the receiver can be changed from the normal stereo mode into a wide stereo mode having a wider sound extent to increase the presence effect.

In the aforegoing description, a single pseudo stereo circuit 21 is provided in a subsequent stage of the second switching circuit 22 (FIG. 1). However, the arrangement may be modified by providing one pseudo stereo circuit in each subsequent stage of the stereo circuit 19 and the mixer 20.

Figure 8:
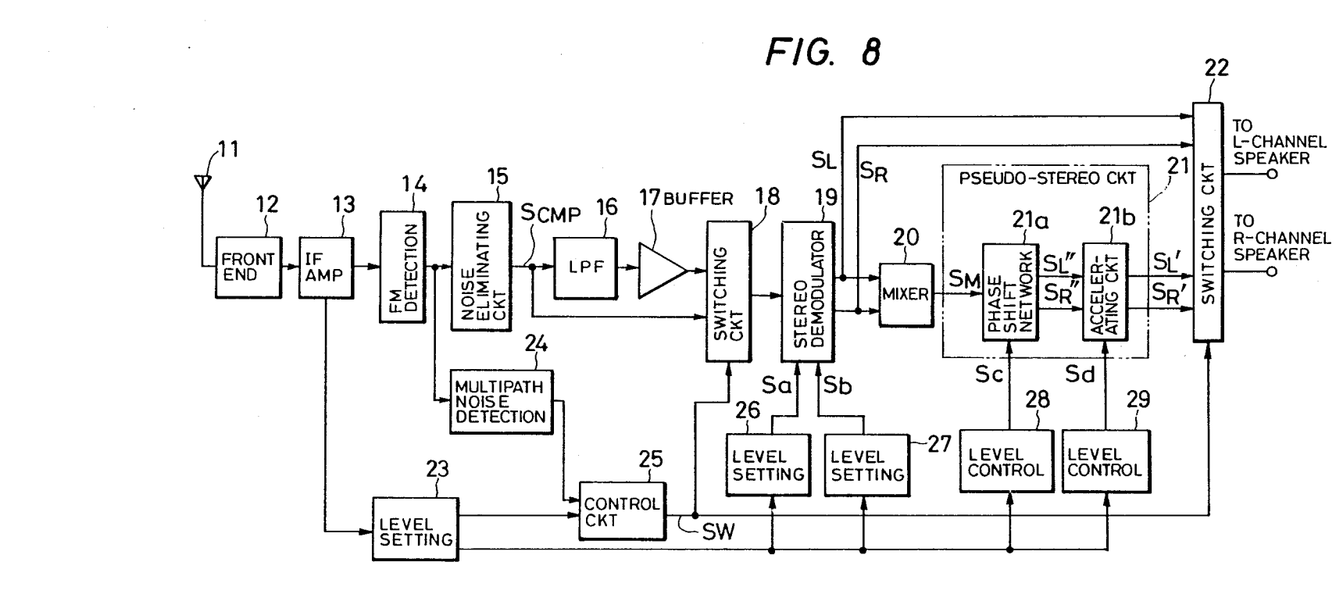
FIG. 8 is a block diagram of a further embodiment of the invention.

In the embodiment of FIG. 1, the stereo effect lacking tendency caused by separation is compensated (sound field correction) by an increase in the pseudo stereo effect in the range of EH2<E<EH1. However, the invention can decrease the acoustic incompatibility as compared to the prior art technology, not necessarily effecting the sound field correction. FIG. 8 shows a modifiation of the invention not effecting the sound field correction. In FIG. 8, circuit components identical to those of FIG. 1 are designated by the same reference numerals.

The arrangement of FIG. 8 is different from that of FIG. 1 in that stereo outputs SL and SR are outputted directly to the speakers, not through the pseudo stereo circuit 21. More specifically, (i) When the received electric field intensity is above a first threshold level EH1 (FIG. 9), the switching circuit 22 directly supplies speakers (not shown) with stereo signals SL and SR (not through the pseudo stereo circuit 21) to establish the stereo mode.

Figure 9:
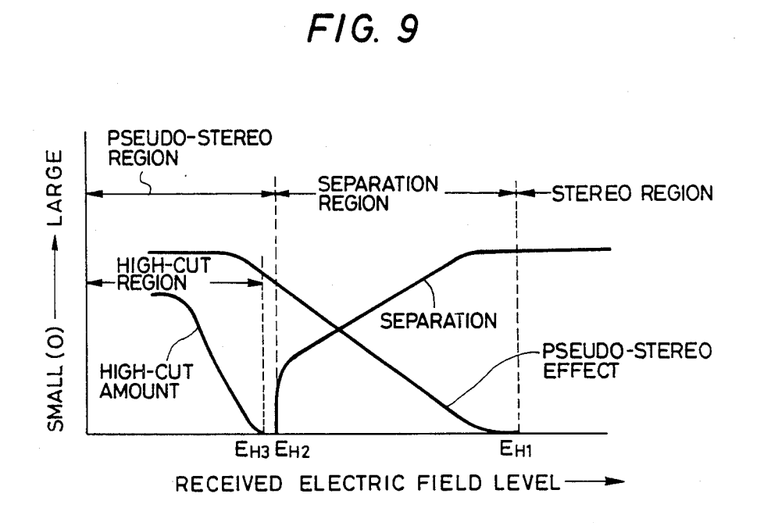
FIG. 9 is a characteristic diagram showing pseudo stereo effect, separation and high-cut degrees against received electric field intensity in the arrangement of FIG. 8.

(ii) When the received electric field intensity is in the range of EH2<E<EH1, outputs SL and SR of the stereo demodulator are still outputted to the speakers. However, since noises begin to increase in the electric field range, the control signal Sa is controlled to cause the separation control circuit 19b to degrade the separation degree as shown in FIG. 9 to improve the S/N ratio as the received electric field intensity decreases. In this range of electric field, control signals Sc and Sd are controlled as shown in FIG. 9 to reinforce the pseudo stereo effect by the pseudo stereo circuit 21. However, since signals are not outputted to the speakers through the pseudo stereo circuit, no sound field correction effect is produced.

(iii) When the multipath noise is large under a received electric field intensity above EH2 or when the received electric field intensity is below EH2, pseudo stereo signals SL' and SR' obtained by entering a monaural signal S in the pseudo stereo circuit 21 are entered in the speakers.

The aforegoing arrangement is referred to as considering both the received electric field intensity and the multipath noise to change the receiver between the stereo and pseudo stereo modes. However, the invention may be arranged to consider only one of the received electric field intensity and the multipath noise to change the receiver between the stereo and pseudo stereo modes. Additionally, the pseudo stereo circuit, switching circuit, etc. may be configured to use DSP (digital signal processor) to process signals.

As explained above, since the invention arrangement is configured to change the receiver from the stereo mode to the pseudo stereo mode having a sound extent in response to the received electric field intensity or the multipath noise level, the S/N ratio during a week electric field can be improved, and an acoustic incompatibility upon a mode change can be removed.

Further, since the pseudo stereo circuit is provided at a subsequent stage of the stereo demodulator so that the pseudo stereo circuit is supplied with a signal based on a signal resulting from a signal processing by a separation control function and a high-cut function in the stereo demodulator, the S/N ratio in the pseudo stereo mode is improved.

Additionally, since the invention is configured so that signals to be entered in the speakers are always extracted through the pseudo stereo circuit regardless of the magnitude of the received electric field intensity, and is configured to not only improve the S/N ratio by degrading the separation degree in response to the received electric field intensity during a weak electric field but also effect a sound field correction to compensate a narrowed sound extent caused by separation control, the S/N ratio is improved in the range of electric field causing a change from the stereo mode into the pseudo stereo mode, maintaining a stereophonic effect.

Moreover, since the invention is configured to establish not only the pseudo stereo mode but also the high-cut mode when the electric field intensity drops or when a multipath occurs, the S/N ratio is further improved, still maintaining a stereophonic effect.

Further, since the invention is configured so that signals to be entered in the speakers are always extracted through the pseudo stereo circuit regardless of the received electric field intensity and so that the degree of the pseudo stereo effect is controlled also in the stereo mode under a large received electric field intensity, a wide stereo mode is established in a strong electric field to further expand the sound extent and increase the presence effect accordingly.

What is claimed is:

1. An FM stereo receiver comprising:
a level detecting circuit for detecting a received electric field intensity; a stereo demodulator for outputting stereo signals for L and R channels, and monaural signals for L and R channels;
a pseudo stereo circuit for (i) changing the phase difference of said stereo signals entered from said stereo demodulator and for outputting a first set of two pseudo stereo signals different in phase, in response thereto, and for (ii) changing the phase difference of said monaural signals entered from said stereo demodulator and for outputting a second set of two pseudo stereo signals different in phase, in response thereto;
means for providing said stereo signals to a set of speakers when said received electric field intensity exceeds a predetermined first threshold level;
means for providing said first set of pseudo stereo signals to said speakers by passing said stereo signals through said pseudo stereo circuit when said received electric field intensity is less than said first threshold level and exceeds a second threshold level which is lower than said first threshold level; and
means for providing said second set of pseudo stereo signals to said set of speakers by passing said monaural signals through said pseudo stereo circuit when said received electric field intensity is less than said second threshold level.

2. An FM stereo receiver comprising:
a multipath noise level detecting circuit for detecting a received multipath noise level;
a stereo demodulator for outputting stereo signals for L and R channels, and monaural signals for L and R channels;
a pseudo stereo circuit for (i) changing the phase difference of said stereo signals entered from said stereo demodulator and for outputting a first set of two pseudo stereo signals different in phase, in response thereto, and for (ii) changing the phase difference of said monaural signals entered from said stereo demodulator and for outputting a second set of two pseudo stereo signals different in phase, in response thereto;
means for providing said stereo signals to a set of speakers when said received multipath noise level is less than a predetermined first threshold level;
means for providing said first set of pseudo stereo signals to said set of speakers by passing said stereo signals through said pseudo stereo circuit when said received multipath noise level exceeds said predetermined first threshold level and is less than a predetermined second threshold level which is greater than said first threshold level; and
means for providing said second set of pseudo stereo signals to said set of speakers by passing said monaural signals through said pseudo stereo circuit when said received multipath noise level exceeds said second threshold level.

3. An FM receiver comprising:
a level detecting circuit for detecting a received electric field intensity;
a multipath noise detecting circuit for detecting the received multipath noise;
a stereo demodulator for outputting stereo signals for L and R channels, and monaural signals for L and R channels; a pseudo stereo circuit for (i) changing the phase difference of said stereo signals entered from said stereo demodulator and for outputting a first set of two pseudo stereo signals different in phase, in response thereto, and for (ii) changing the phase difference of said monaural signals entered from said stereo demodulator and for outputting a second set of two pseudo stereo signals different in phase, in response thereto;
means for providing said stereo signals to a set of speakers when said electric field intensity exceeds a predetermined first threshold level and no multipath noise is produced;

means for providing said first set of pseudo stereo signals to said speakers by passing said stereo signals through said pseudo stereo circuit when said received electric field intensity is less than said first threshold level and exceeds a predetermined second threshold level which is lower than said first threshold level, and no multipath noise is produced; and means for providing said second set of pseudo stereo signals to said speakers by passing said monaural signals through said pseudo stereo circuit when said received electric field intensity exceeds said first threshold level in the presence of said multipath noise; and means for providing said second set of pseudo stereo signals to said speakers by passing said monaural signals through said pseudo stereo circuit when said received electric field intensity is less than said second threshold level.

4. An FM stereo receiver according to claim 3 configured to acknowledge presence of a multipath noise when the multipath noise detection circuit detects a multipath noise level above a predetermined threshold level.

5. An FM stereo receiver comprising:

a level detecting circuit for detecting a received electric field intensity;

a stereo demodulator for outputting stereo signals for L and R channels, and monaural signals for L and R channels;

a separation control circuit responsive to an output of said level detecting circuit for changing the separation degree of said stereo signal outputs;

a pseudo stereo circuit for (i) changing the phase difference of said stereo signals entered from said separation control circuit and for outputting a first set of two pseudo stereo signals different in phase, in response thereto, and for (ii) changing the phase difference of said monaural signals entered from said stereo demodulator, and for outputting a second set of two pseudo stereo signals different in phase, in response thereto;

means for providing said stereo signals from said stereo demodulator to a set of speakers when said received electric field intensity exceeds a predetermined first threshold level;

means for providing said first set of pseudo stereo signals to said set of speakers by passing said stereo signals through said separation control circuit and through said pseudo stereo circuit when said received electric field intensity is less than said first threshold level and exceeds a second threshold level which is lower than said first threshold level; and means for providing said second set of pseudo stereo signals to said speakers by passing said monaural signals through said pseudo stereo circuit when said received electric field intensity is less than a second threshold level.

6. An FM stereo receiver according to claim 5 configured to activate a high-cut control to remove components below a predetermined frequency when the received electric field intensity is a weak electric field below a third threshold level lower than said second threshold level.

7. An FM stereo receiver according to claim 5 wherein said stereo signals are outputted to speakers through said pseudo stereo circuit also in the stereo mode.

8. An FM stereo receiver according to claim 5 wherein the sound field correction effect by said pseudo stereo circuit is increased as the received electric field intensity increases to change the FM stereo receiver from the stereo mode into a wide stereo mode in response to the received electric field intensity when the received electric field intensity is below said first threshold level.

9. An FM stereo receiver according to claim 5 further comprising a multipath noise detecting circuit for detecting a multipath noise so as to change the FM stereo receiver between the stereo and pseudo stereo modes in response to the multipath noise level regardless of the received electric field intensity.

* * * * *

UNITED STATES PATENT AND TRADEMARK OFFICE
CERTIFICATE OF CORRECTION

PATENT NO. : 4,833,715
DATED : May 23, 1989
INVENTOR(S) : Tsuneo Sakai

It is certified that error appears in the above-identified patent and that said Letters Patent is hereby corrected as shown below:

ON THE TITLE PAGE

[73] Assignee:

Correct Assignee is --ALPINE ELECTRONICS INC.--

Signed and Sealed this

Twenty-eighth Day of May, 1991

*Attest:*

HARRY F. MANBECK, JR.

*Attesting Officer*

*Commissioner of Patents and Trademarks*